US010711500B1

(12) United States Patent
Bolton et al.

(10) Patent No.: US 10,711,500 B1
(45) Date of Patent: Jul. 14, 2020

(54) PERMANENT MAGNET DAMPING AND GENERATED LIGHT

(71) Applicant: The Boeing Company, Chicago, IL (US)

(72) Inventors: Joseph A. Bolton, Newalla, OK (US); Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/520,173

(22) Filed: Jul. 23, 2019

(51) Int. Cl.

| | |
|---|---|
| ***H05B 45/10*** | (2020.01) |
| ***E05F 5/02*** | (2006.01) |
| ***H01F 7/02*** | (2006.01) |
| ***F21V 23/04*** | (2006.01) |
| *B64D 11/00* | (2006.01) |
| *F21Y 115/10* | (2016.01) |

(52) U.S. Cl.
CPC .......... *E05F 5/022* (2013.01); *F21V 23/0471* (2013.01); *H01F 7/02* (2013.01); *H05B 45/10* (2020.01); *B64D 11/003* (2013.01); *E05Y 2900/502* (2013.01); *F21Y 2115/10* (2016.08)

(58) Field of Classification Search
None
See application file for complete search history.

(56) References Cited

U.S. PATENT DOCUMENTS 7,540,639 B2 6/2009 Clark
7,717,593 B2 5/2010 Clark
2011/0104017 A1* 5/2011 Migliore ................ C02F 1/002 422/186.3
2015/0065301 A1* 3/2015 Oteman .............. A63B 21/005 482/2
2019/0178325 A1* 6/2019 Griffin .................... F16F 6/005

* cited by examiner

*Primary Examiner* — Jimmy T Vu
*Assistant Examiner* — Laura Yesildag
(74) *Attorney, Agent, or Firm* — Haynes and Boone LLP

(57) ABSTRACT

Systems, methods, and apparatus for permanent magnet damping and generated light are disclosed. In one or more embodiments, a method for damping and generating light comprises damping, by a permanent magnet (PM) damper connected to a panel (e.g., a door of an aircraft luggage bin), the speed of opening of the panel, while the panel is opened. The method further comprises generating, by the PM damper, electrical power, during the opening of the panel. Also, the method comprises storing the electrical power in an electrical power storage unit, such as a capacitor or a battery. In addition, the method comprises powering, by using the stored electrical power, lighting, such as a lighting emitting diode (LED). Further, the method comprises dissipating any remaining electrical power of the electrical power, which is stored in the electrical power storage unit, when the panel is closed.

20 Claims, 15 Drawing Sheets

900

910 START

920 DAMPING, BY A PERMANENT MAGNET (PM) DAMPER CONNECTED TO A PANEL, A SPEED OF OPENING OF THE PANEL, WHILE THE PANEL IS OPENED

930 GENERATING, BY THE PM DAMPER, ELECTRICAL POWER, DURING THE OPENING OF THE PANEL

940 STORING THE ELECTRICAL POWER

950 POWERING, BY USING THE ELECTRICAL POWER, LIGHTING

960 DISSIPATING ANY REMAINING ELECTRICAL POWER OF THE ELECTRICAL POWER, WHICH IS STORED, WHEN THE PANEL IS CLOSED

970 END

100

150
130
130
130
140
140
140
140
140
120
120
120
110
105

410
400
420
420
420
430
440
450

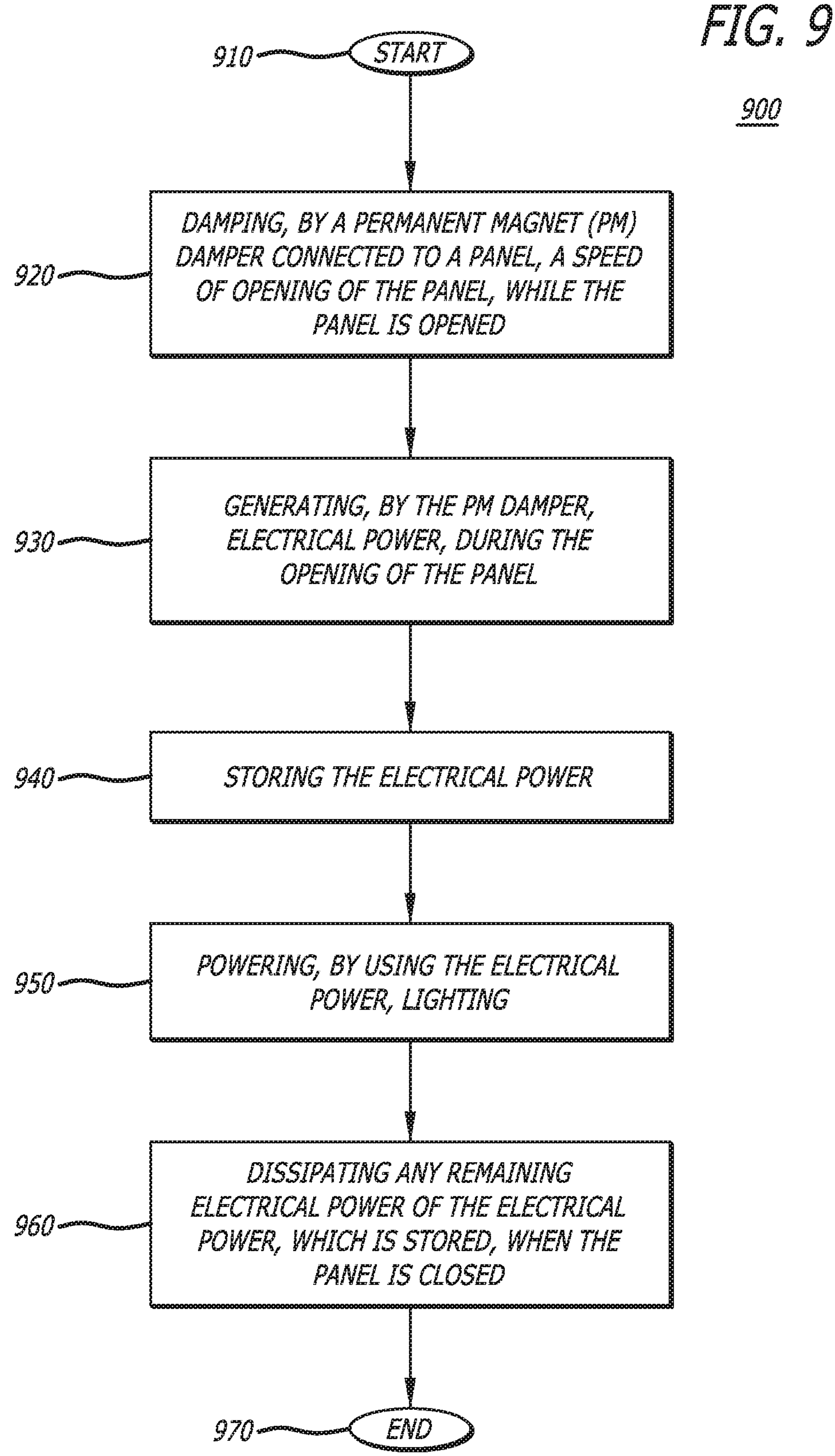
FIG. 9
900
910
START
920
DAMPING, BY A PERMANENT MAGNET (PM) DAMPER CONNECTED TO A PANEL, A SPEED OF OPENING OF THE PANEL, WHILE THE PANEL IS OPENED
930
GENERATING, BY THE PM DAMPER, ELECTRICAL POWER, DURING THE OPENING OF THE PANEL
940
STORING THE ELECTRICAL POWER
950
POWERING, BY USING THE ELECTRICAL POWER, LIGHTING
960
DISSIPATING ANY REMAINING ELECTRICAL POWER OF THE ELECTRICAL POWER, WHICH IS STORED, WHEN THE PANEL IS CLOSED
970
END

PERMANENT MAGNET DAMPING AND GENERATED LIGHT

FIELD

The present disclosure relates to permanent magnet damping. In particular, the present disclosure relates to permanent magnet damping and generated light.

BACKGROUND

An aircraft luggage bin typically opens and closes to the space above the passenger seating and holds luggage. Each of these luggage bins can generally hold three or more small carry-on pieces of luggage weighing around twenty (20) pounds apiece. Passengers will often want access to their carry-on luggage at some time during the flight, especially on long international flights, and these bins usually get opened and closed multiple times. With a dark cabin interior, seeing in the enclosed space of an opened luggage bin is difficult. Lighting for the luggage bins would be convenient, but running wires from the aircraft's power supply is costly, would incur unnecessary added weight, and would require maintenance. In addition, the running of wires to power luggage bin lighting is a waste of payload and the aircraft's power.

These bins usually open by letting the unlatched bin fall under the luggage weight by gravity. Currently, hydraulic dampers are employed within the bins to control the speed of the opening of the luggage bins. However, hydraulic dampers eventually wear out due to their high precision requirements and O-ring wear, after being cycled thousands of times during hundreds of flights. The hydraulic dampers dissipate the energy from the luggage bin opening under gravity as heat, which serves no useful purpose.

In light of the foregoing, there is a need for an improved damper design that additionally provides lighting.

SUMMARY

The present disclosure relates to a method, system, and apparatus for permanent magnet damping and generated light. In one or more embodiments, a method for damping and generating light comprises damping, by a permanent magnet (PM) damper connected to a panel (e.g., a door of an aircraft luggage bin), the speed of opening of the panel, while the panel is opened. The method further comprises generating, by the PM damper, electrical power, during the opening of the panel. Also, the method comprises storing the electrical power in an electrical power storage unit. In addition, the method comprises powering, by using the stored electrical power, lighting. Further, the method comprises dissipating any remaining electrical power of the electrical power, which is stored in the electrical power storage unit, when the panel is closed. In one or more embodiments, the method further comprises dissipating any remaining electrical power of the electrical power, which is stored, when the panel is closed.

In at least one embodiment, the method further comprises, when the panel is opened, switching a switch to connect the PM damper to an electrical power storage unit such that the electrical power is stored in the electrical power storage unit. In some embodiments, the electrical power storage unit is at least one capacitor and/or at least one battery. In at least one embodiment, a control circuit switches the switch.

In one or more embodiments, the method further comprises, when the panel is closed, switching a switch to connect the PM damper to a resistor connected to ground such that any remaining electrical power of the electrical power, which is stored, is dissipated. In some embodiments, a control circuit switches the switch.

In at least one embodiment, the PM damper comprises a plunger and a cylinder. In one or more embodiments, the plunger comprises a conductive coil, and the cylinder comprises at least one permanent magnet. In some embodiments, the plunger comprises at least one permanent magnet, and the cylinder comprises a conductive coil.

In one or more embodiments, the lighting comprises at least one light emitting diode (LED). In some embodiments, the lighting is located inside an enclosure located behind the panel.

In at least one embodiment, a system for damping and generating light comprises a permanent magnet (PM) damper connected to a panel to damp a speed of opening of the panel while the panel is opened, and to generate electrical power during the opening of the panel. The system further comprises an electrical power storage unit to store the electrical power. Further, the system comprises lighting, which is powered by the electrical power.

In one or more embodiments, the system further comprises a switch to connect the PM damper to the electrical power storage unit, when the panel is opened, such that the electrical power is stored in the electrical power storage unit. In some embodiments, the electrical power storage unit is at least one capacitor and/or at least one battery.

In one or more embodiments, the system further comprises a switch to connect the PM damper to a resistor connected to ground, when the panel is closed, such that any remaining electrical power of the electrical power, which is stored, is dissipated.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 5A:
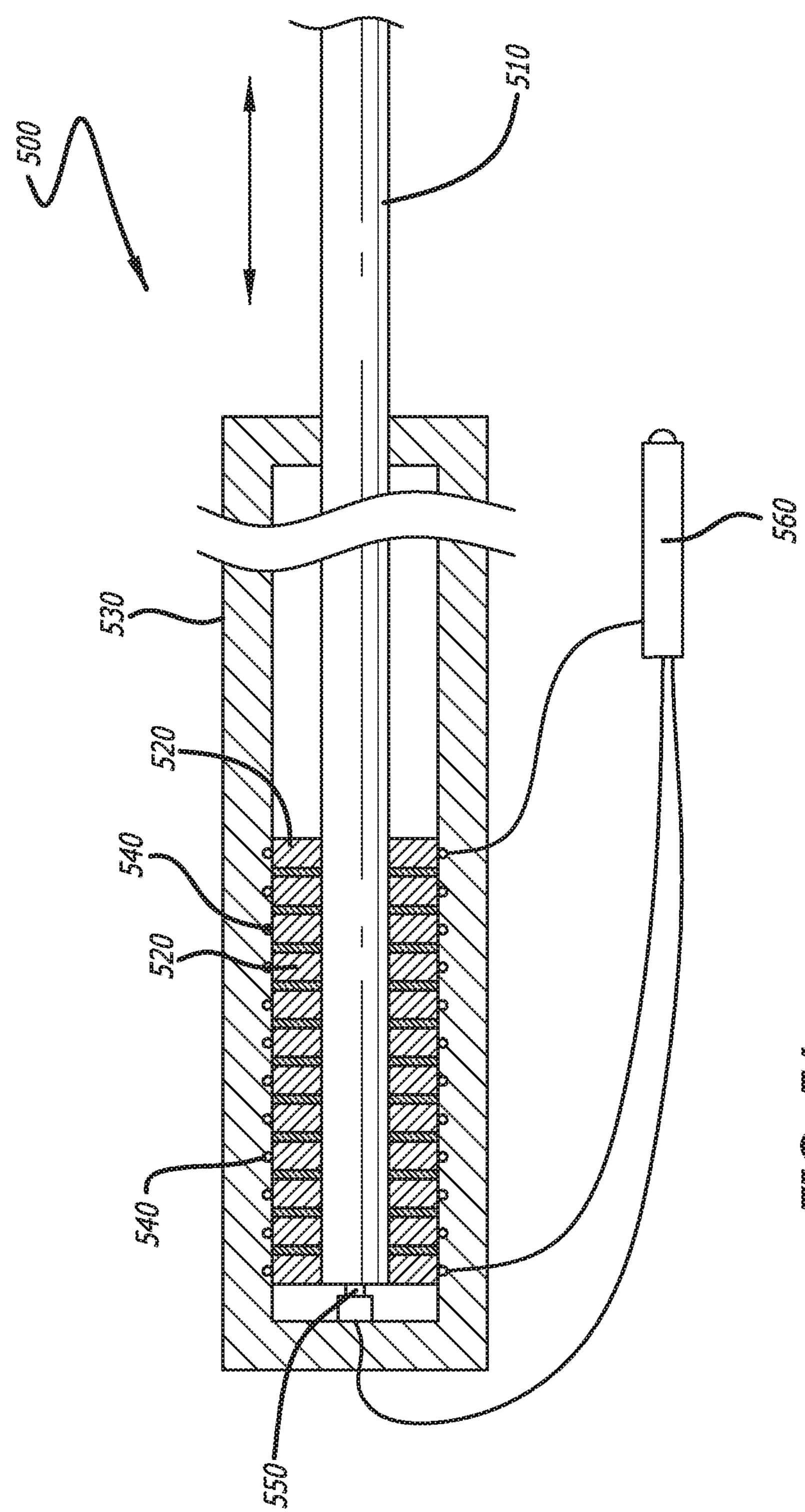

FIG. 5A is a diagram showing an exemplary PM damper that may be employed by the disclosed system for permanent magnet damping and generated light, where the PM damper comprises (1) a plunger that comprises permanent magnets, (2) a cylinder that comprises a conductive coil, and (3) an optional pressure switch, where the plunger is in a closed (compressed) position, in accordance with at least one embodiment of the present disclosure.

Figure 5B:
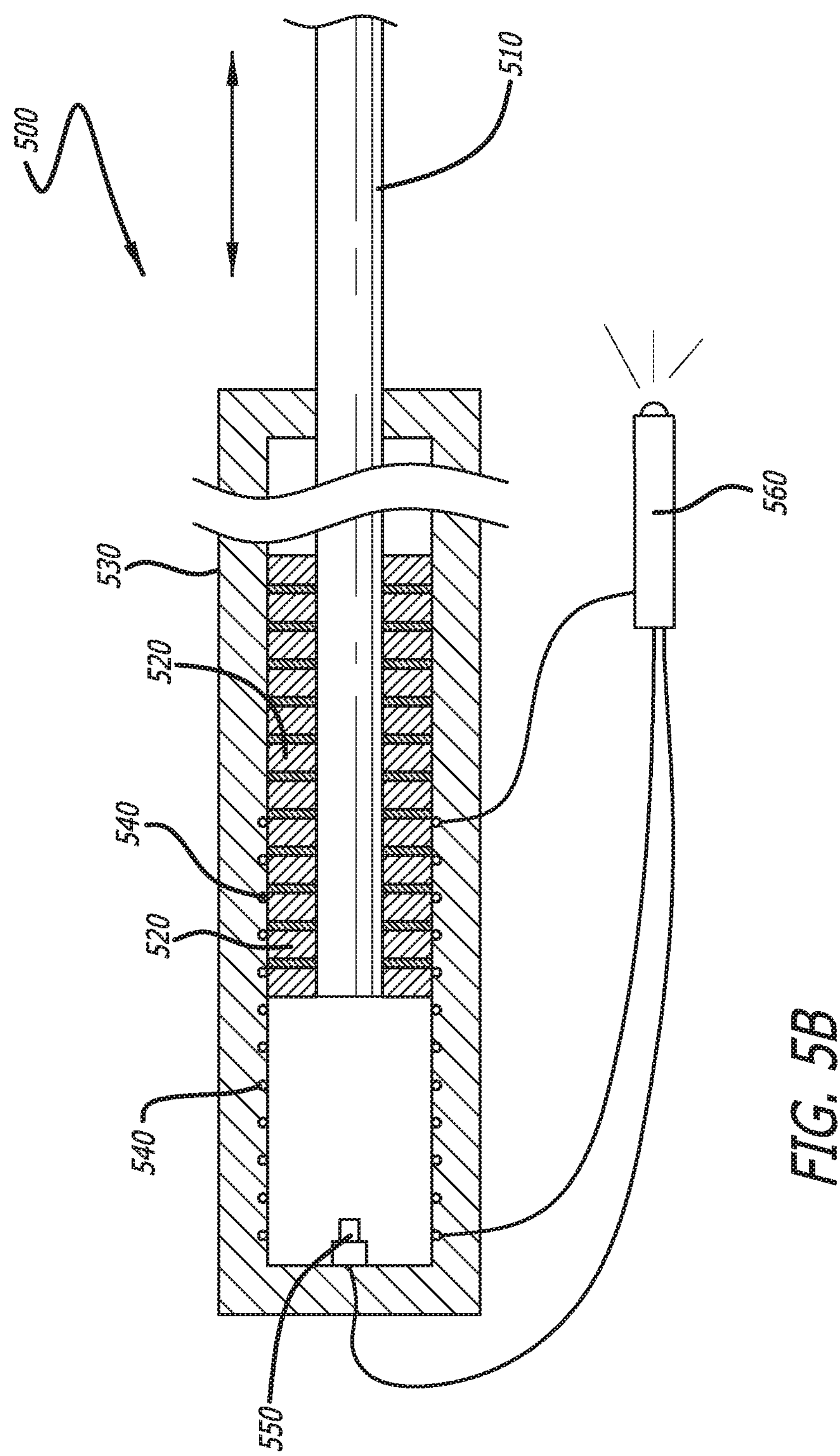

FIG. 5B is a diagram showing the exemplary PM damper of FIG. 5A, where the plunger is in an open (extended) position, in accordance with at least one embodiment of the present disclosure.

Figure 6A:
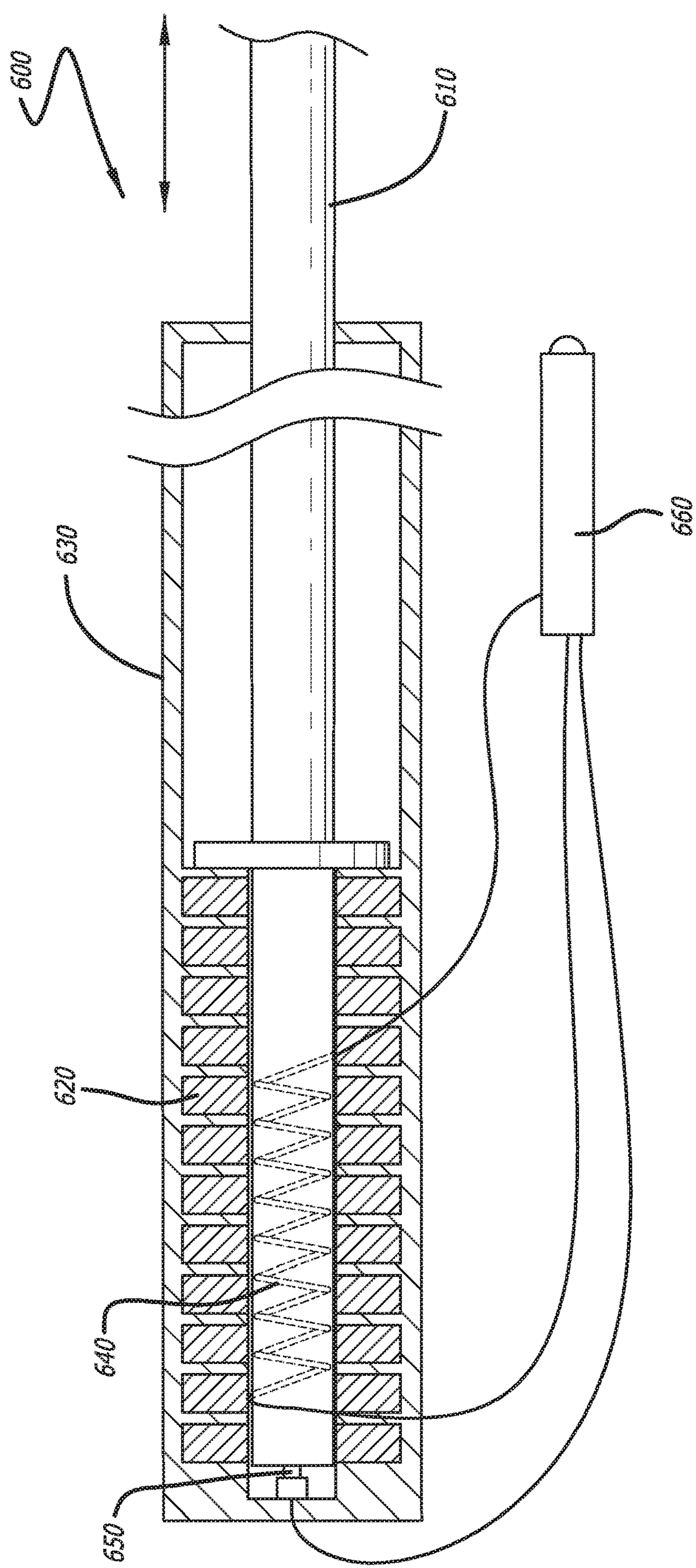

FIG. 6A is a diagram showing an exemplary PM damper that may be employed by the disclosed system for permanent magnet damping and generated light, where the PM damper comprises (1) a plunger that comprises a conductive coil, (2) a cylinder that comprises permanent magnets, and (3) an optional pressure switch, where the plunger is in a closed (compressed) position, in accordance with at least one embodiment of the present disclosure.

Figure 6B:
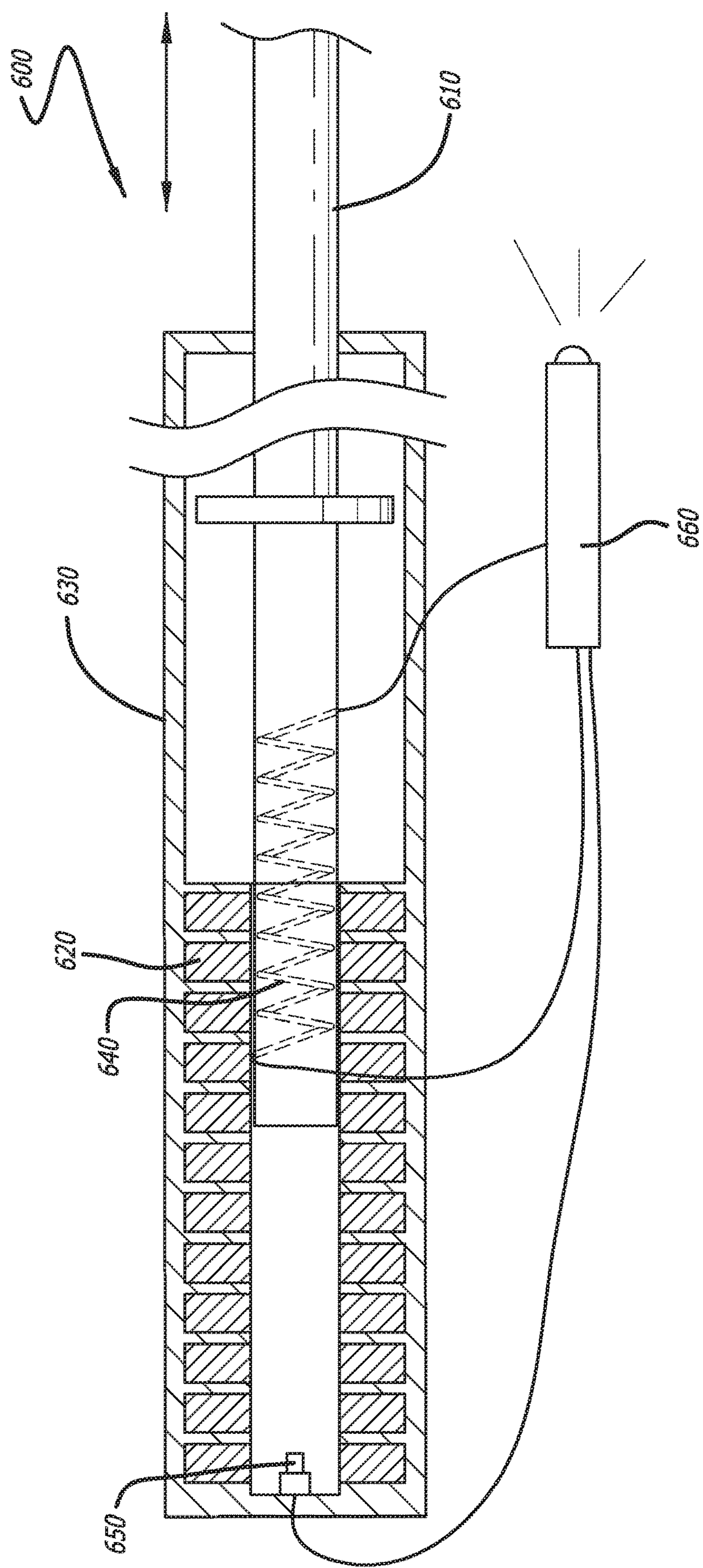

FIG. 6B is a diagram showing the exemplary PM damper of FIG. 6A, where the plunger is in an open (extended) position, in accordance with at least one embodiment of the present disclosure.

Figure 7A:
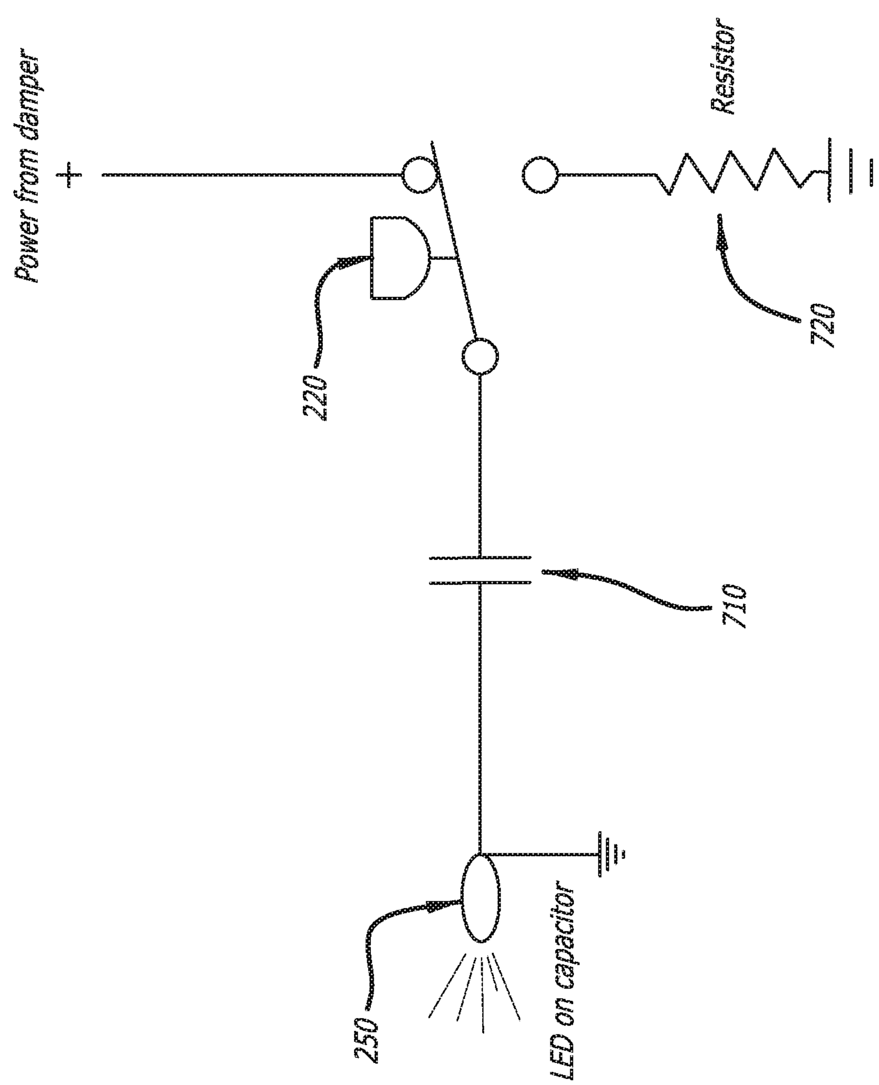

FIG. 7A is a diagram showing an exemplary circuit employed for the disclosed system for permanent magnet damping and generated light, where the system employs a pressure switch and the aircraft luggage bin is in an open position, in accordance with at least one embodiment of the present disclosure.

Figure 7B:
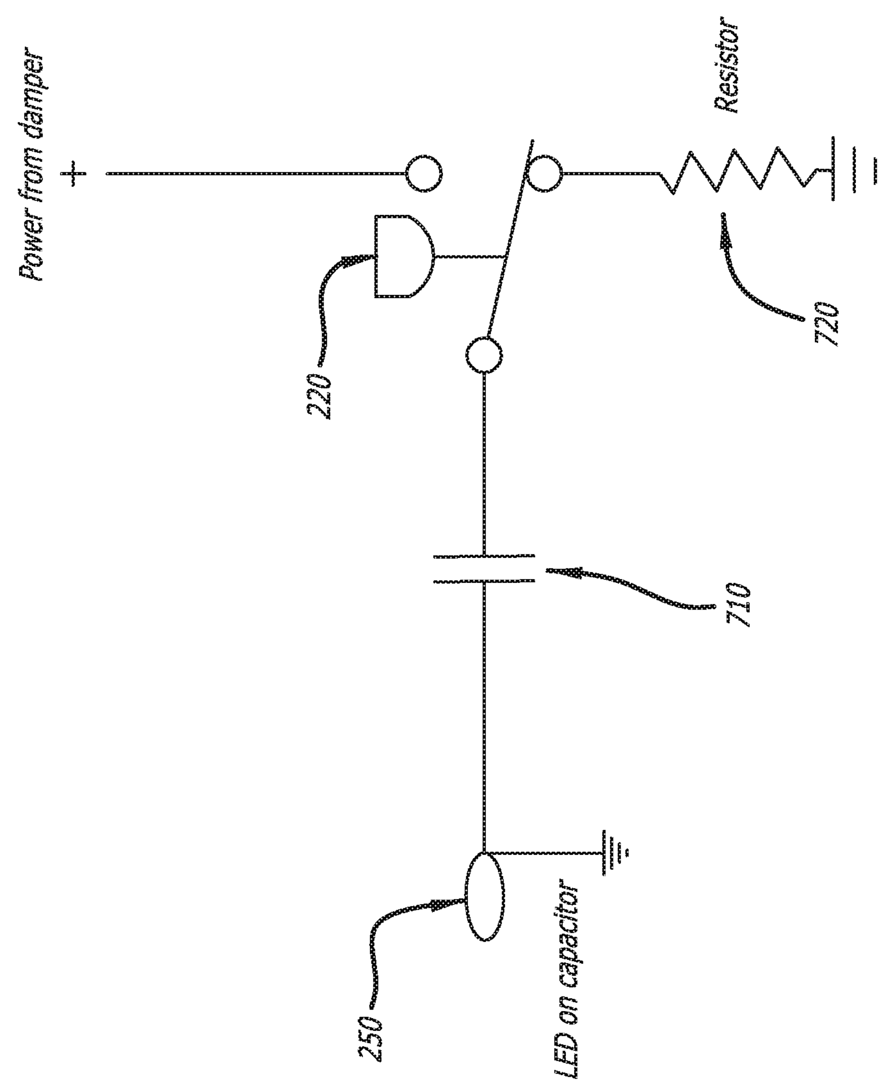

FIG. 7B is a diagram showing the exemplary circuit of FIG. 7A, where the system employs a pressure switch and the aircraft luggage bin is in a closed position, in accordance with at least one embodiment of the present disclosure.

Figure 8A:
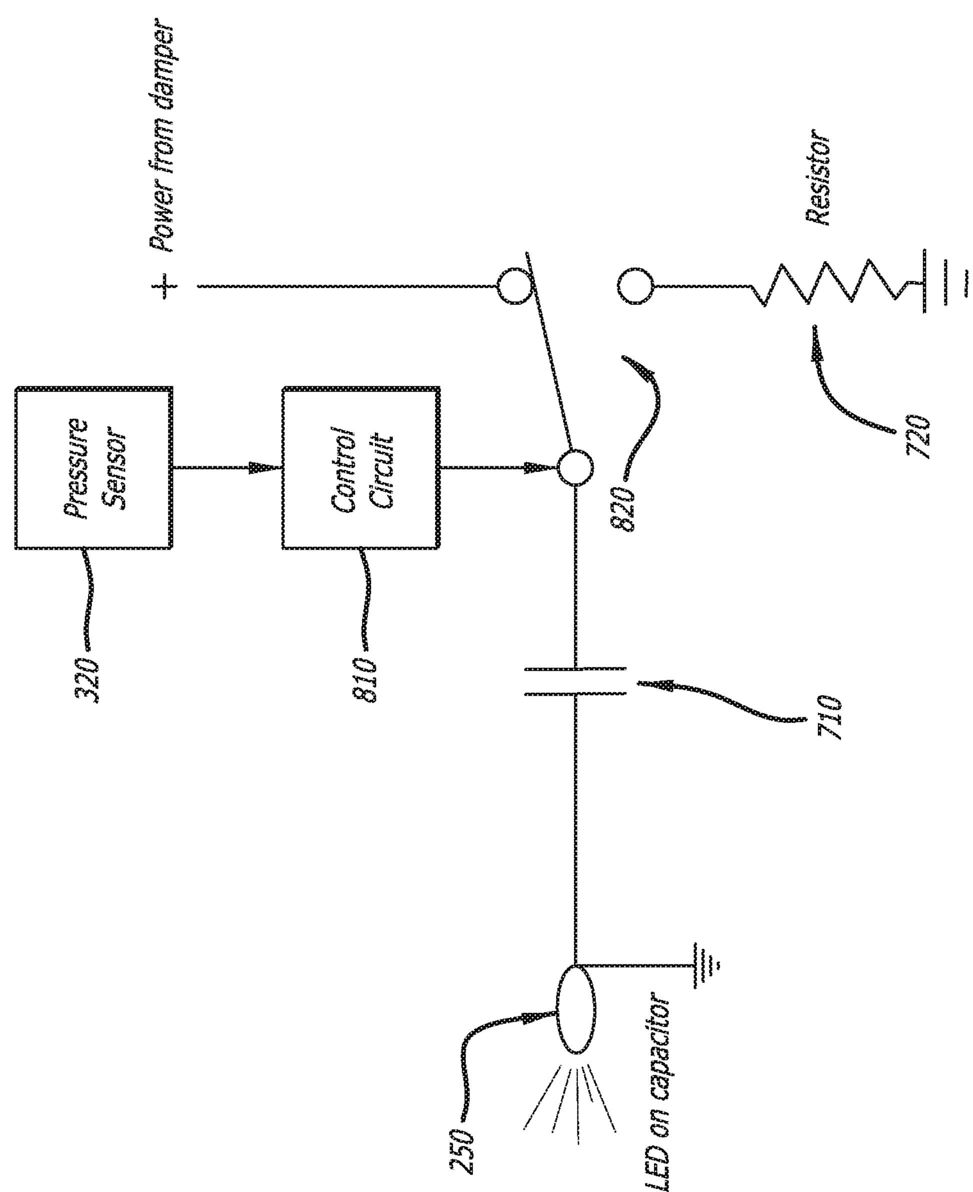

FIG. 8A is a diagram showing an exemplary circuit employed for the disclosed system for permanent magnet damping and generated light, where the system employs a pressure sensor and the aircraft luggage bin is in an open position, in accordance with at least one embodiment of the present disclosure.

Figure 8B:
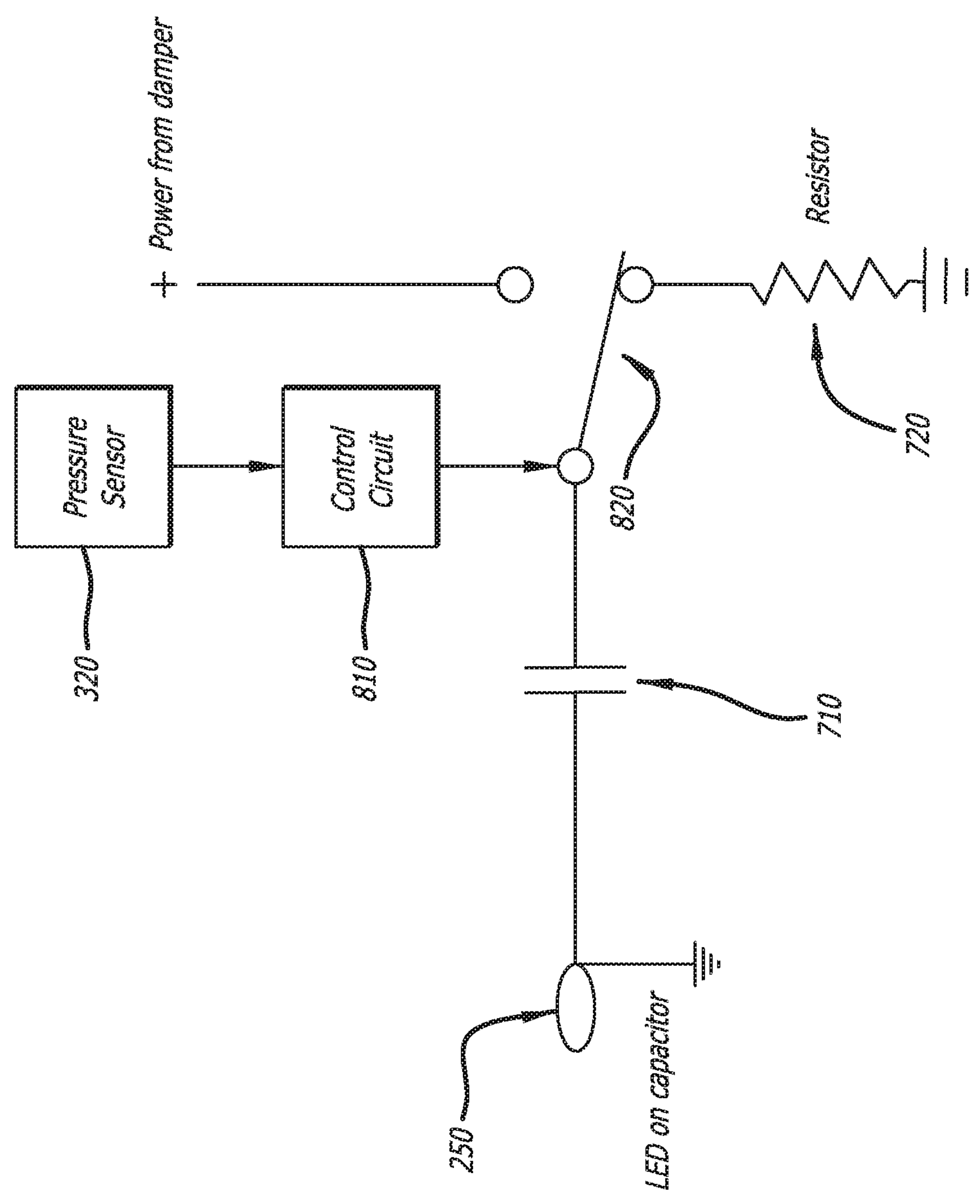

FIG. 8B is a diagram showing the exemplary circuit of FIG. 8A, where the system employs a pressure sensor and the aircraft luggage bin is in a closed position, in accordance with at least one embodiment of the present disclosure.

FIG. 9 a flow chart showing the disclosed method for damping and generating light, in accordance with at least one embodiment of the present disclosure.

DESCRIPTION

The methods and apparatus disclosed herein provide an operative system for permanent magnet damping and generated light. In one or more embodiments, the system of the present disclosure employs a permanent magnet damper to provide lighting to the interior of an aircraft luggage bin. The permanent magnet (PM) damper is wired such that when the luggage bin is opened, the permanent magnet damper is actuated and produces electrical power that is stored in a capacitor (or battery). The stored electrical power is used to power lighting (e.g., a light emitting diode (LED)) within the luggage bin to illuminate the interior of the luggage bin, while the luggage bin is open. The permanent magnet damper is also designed such that the effective damping of the speed of opening the luggage bin is within design limitations.

As previously mentioned above, an aircraft luggage bin typically opens and closes to the space above the passenger seating and holds luggage. Lighting for the luggage bins would be convenient, but running wires from the aircraft's power supply is costly, would incur unnecessary added weight, and would require maintenance. In addition, the running of wires to power luggage bin lighting is a waste of payload and the aircraft's power. These bins open by letting the unlatched bin fall under the luggage weight by gravity. Currently, hydraulic dampers are employed within the luggage bins to control the speed of the opening of the luggage bins. However, hydraulic dampers eventually wear out due to their high precision requirements and O-ring wear, after being cycled thousands of times during hundreds of flights. The hydraulic dampers dissipate the energy from the luggage bin opening under gravity as heat, which serves no useful purpose.

The system of the present disclosure provides a solution to both the reliability cost of hydraulic dampers and the need for luggage bin lighting, all without any extra weight or expense of wiring for the luggage bin lighting. The disclosed system employing a permanent magnet damper for damping and lighting of an aircraft luggage bin can be easily retrofit into older aircraft or into current production merely by substituting the disclosed system for the existing hydraulic dampers.

The disclosed system uses a permanent magnet damper to provide lighting to the interior of an aircraft luggage bin. The permanent magnet damper would replace the currently used hydraulic dampers that control the speed a luggage bin door opens. The permanent magnet damper converts energy of motion into electrical power, and is actuated once the luggage bin is opened. The electrical power output from the moving coils and magnets in the permanent magnet damper is stored in a capacitor (or battery). The stored electrical power is used to power lighting (e.g., a light emitting diode (LED)) to illuminate the interior of the luggage bin while the luggage bin is open.

Permanent magnet dampers have a greater inherent reliability than hydraulic dampers. Their inherent reliability comes from their design that converts kinetic energy from movement to electrical power. Permanent magnet dampers are not reliant on extreme tolerances and smooth surfaces for sealing on an O-ring and shaft like hydraulic dampers. And, permanent magnets that resist a moving coil are not known to lose their magnetism and, hence, they will always operate as permanent magnets.

It should be noted that although the embodiments for the disclosed system described the present disclosure are directed to luggage bins on aircraft. The disclosed system may be employed for bins (or doors or panels of any kind) that are housed on various different types of vehicles (e.g., airborne vehicles, terrestrial vehicles, space vehicles, and marine vehicles) or stationary structures (e.g., commercial buildings and residential buildings).

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to permanent magnet dampers, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Figure 1:
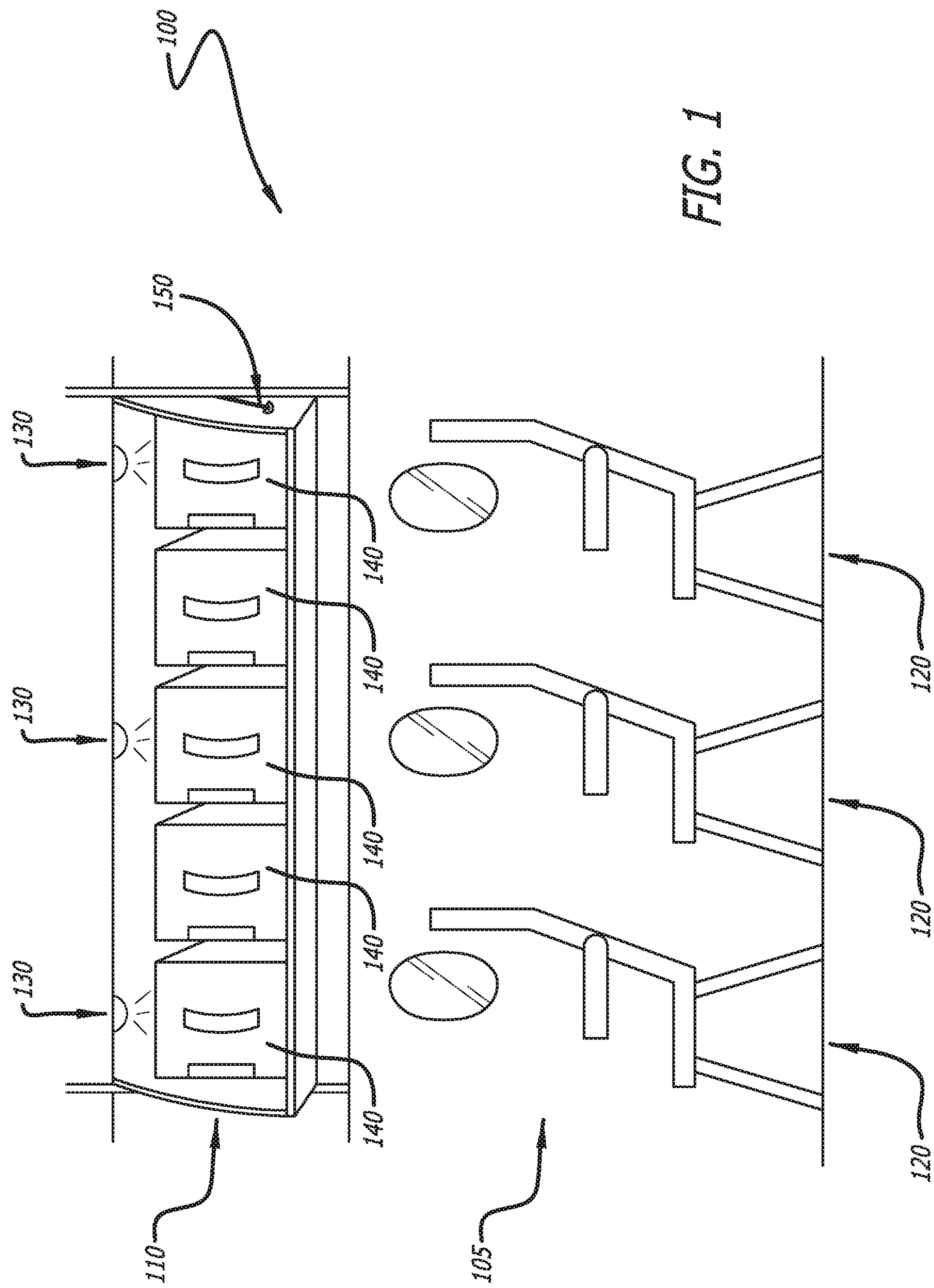
FIG. 1 is a diagram showing an exemplary aircraft luggage bin in a cabin of an aircraft that may employ the disclosed system for permanent magnet damping and generated light, in accordance with at least one embodiment of the present disclosure.

FIG. 1 is a diagram showing an exemplary aircraft luggage bin 110 in a cabin 105 of an aircraft 100 that may employ the disclosed system for permanent magnet damping and generated light, in accordance with at least one embodiment of the present disclosure. In this figure, the aircraft 100 is shown to comprises a luggage bin 110 located in the cabin 105 above an aisle of seats 120. The luggage bin 110 is shown to be in an open position and multiple pieces of luggage 140 are stored within the luggage bin 110.

The luggage bin 110 comprises a plurality of lights (e.g., which may comprise light emitting diodes (LEDs)) 130 and a damper 150. When the luggage bin 110 is in an open position, as is shown in FIG. 1, the lights 130 are illuminated to illuminate the interior of the luggage bin 110 so that passengers and flight attendants may easily view the luggage 140 stored within the luggage bin 110 even when the cabin 105 of the aircraft 100 is dark. The damper 150 is used to control the speed (i.e. slow the speed) of the opening of the luggage bin 110 so that the luggage bin 110 does not open at a rapid speed under the luggage weight by gravity. The system of the present disclosure employs a permanent magnet (PM) damper for the damper 150 to control the speed of the opening of the luggage bin 110 and to provide electrical power to power the lighting 130 to illuminate the interior of the luggage bin 110.

Figure 2A:
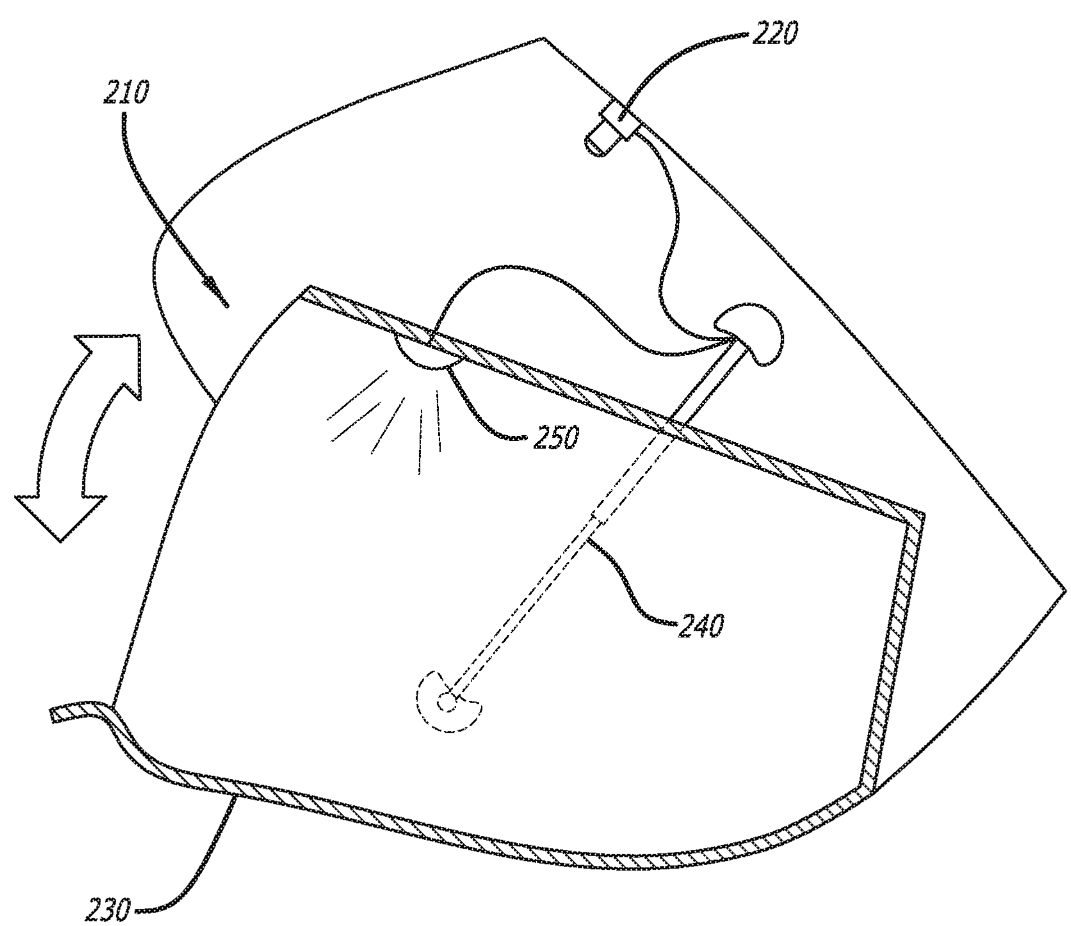
FIG. 2A is a diagram showing an aircraft luggage bin employing the disclosed system for permanent magnet damping and generated light, where the system employs a pressure switch and the aircraft luggage bin is in an open position, in accordance with at least one embodiment of the present disclosure.

FIG. 2A is a diagram showing an aircraft luggage bin 210 employing the disclosed system for permanent magnet damping and generated light, where the system employs a pressure switch 220 and the aircraft luggage bin 210 is in an open position, in accordance with at least one embodiment of the present disclosure. In this figure, the luggage bin 210 is shown to comprise a panel (e.g., a front panel) 230, a PM damper 240, a light (e.g., a LED) 250, and the pressure switch 220. The light 250 is located inside the interior of the luggage bin 210 (e.g., inside an enclosure) behind the panel 230 of the luggage bin 210.

During the opening of the panel 230 of the luggage bin 210, the PM damper 240 damps (i.e. slows) the speed of the opening of the panel 230 (and the luggage bin 210 itself), and generates electrical power. After the panel 230 of the luggage bin 210 is opened, a surface of the luggage bin 210 is no longer depressing the pressure switch 220. The undepressed pressure switch 220 switches to allow for any electrical power generated by the PM damper 240 to be stored within an electrical storage unit, such as a capacitor (e.g., refer to 710 of FIG. 7A) or a battery, and for the electrical power to be used to power the light 250.

Figure 2B:
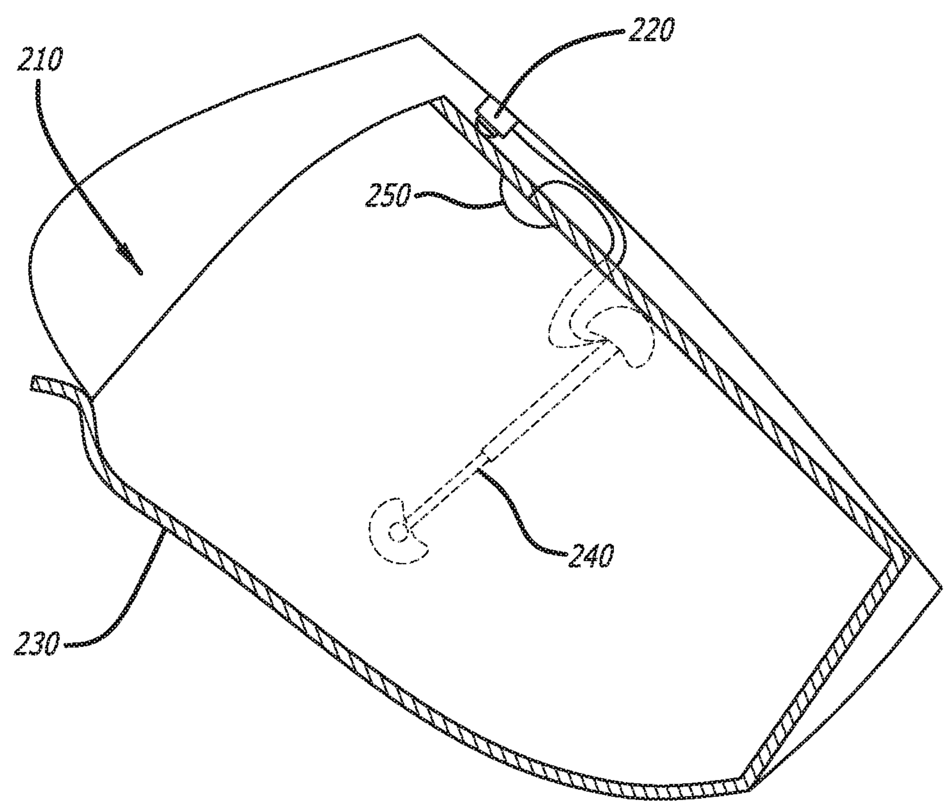
FIG. 2B is a diagram showing the aircraft luggage bin of FIG. 2A employing the disclosed system for permanent magnet damping and generated light, where the system employs a pressure switch and the aircraft luggage bin is in a closed position, in accordance with at least one embodiment of the present disclosure.

FIG. 2B is a diagram showing the aircraft luggage bin 210 of FIG. 2A employing the disclosed system for permanent magnet damping and generated light, where the system employs a pressure switch 220 and the aircraft luggage bin 210 is in a closed position, in accordance with at least one embodiment of the present disclosure. In this figure, after the panel 230 of the luggage bin 210 is closed, a surface of the luggage bin 210 is depressing the pressure switch 220. The depressed pressure switch 220 switches to allow for any electrical power stored within the electrical storage unit to be dissipated, and for the electrical power to no longer power the light 250.

Figure 3A:
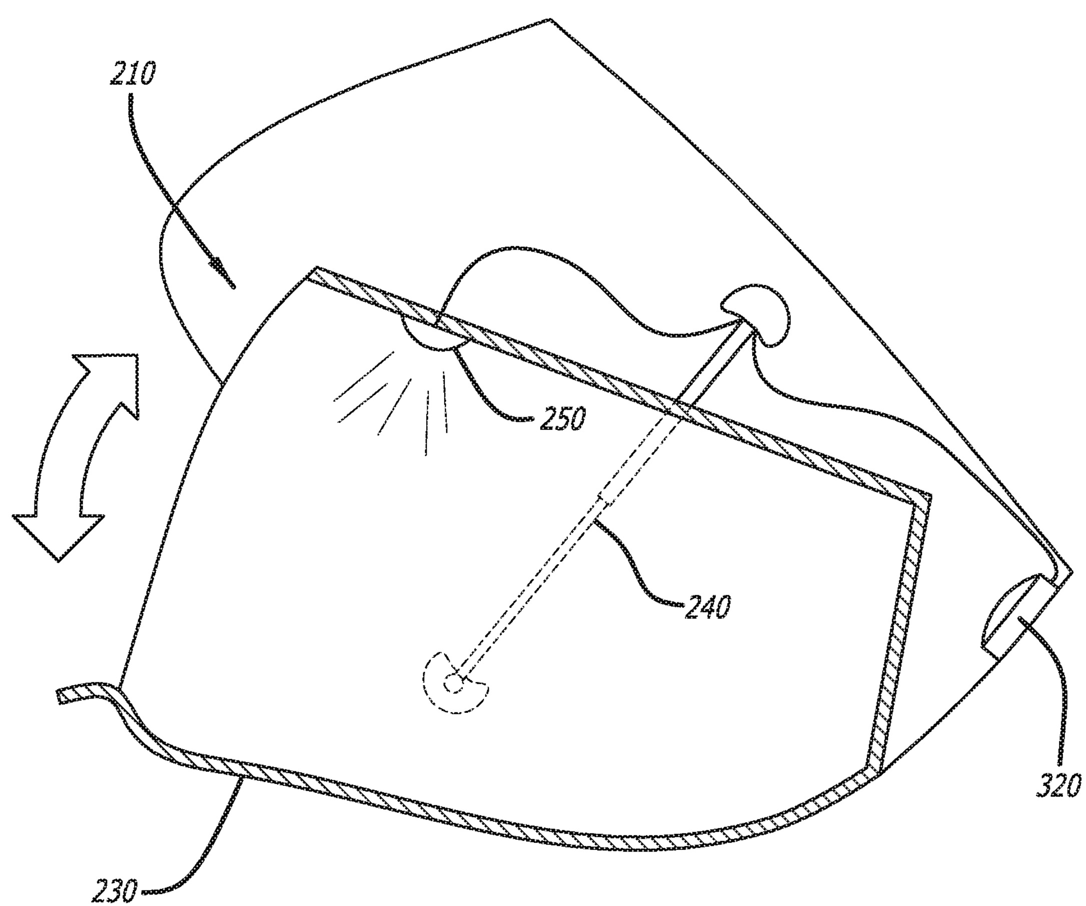
FIG. 3A is a diagram showing an aircraft luggage bin employing the disclosed system for permanent magnet damping and generated light, where the system employs a pressure sensor and the aircraft luggage bin is in an open position, in accordance with at least one embodiment of the present disclosure.

FIG. 3A is a diagram showing an aircraft luggage bin 210 employing the disclosed system for permanent magnet damping and generated light, where the system employs a pressure sensor 320 and the aircraft luggage bin 210 is in an open position, in accordance with at least one embodiment of the present disclosure. In this figure, the luggage bin 210 is shown to comprise a panel (e.g., a front panel) 230, a PM damper 240, a light (e.g., a LED) 250, and the pressure sensor 320.

During the opening of the panel 230 of the luggage bin 210, the PM damper 240 damps (i.e. slows) the speed of the opening of the panel 230 (and the luggage bin 210 itself), and generates electrical power. After the panel 230 of the luggage bin 210 is opened, the pressure sensor 320 no longer senses a surface of the luggage bin 210. Once the pressure sensor 320 no longer senses a surface of the luggage bin 210, the pressure sensor 320 notifies a control circuit (e.g., refer to 810 of FIG. 8A) that the luggage bin 210 is in an open position. Once the control circuit is notified that the luggage bin 210 is in an open position, the control circuit switches a switch (e.g., refer to 820 of FIG. 8A) to allow for any electrical power generated by the PM damper 240 to be stored within an electrical storage unit, such as a capacitor (e.g., refer to 710 of FIG. 8A) or a battery, and for the electrical power to be used to power the light 250.

Figure 3B:
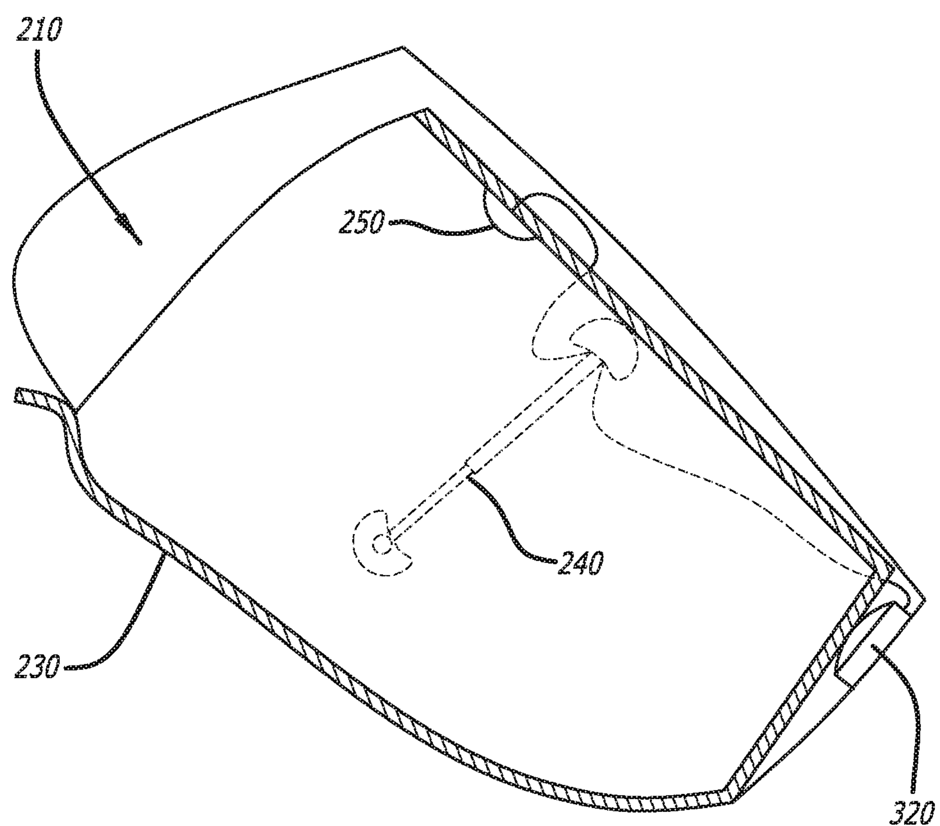
FIG. 3B is a diagram showing the aircraft luggage bin of FIG. 3A employing the disclosed system for permanent magnet damping and generated light, where the system employs a pressure sensor and the aircraft luggage bin is in a closed position, in accordance with at least one embodiment of the present disclosure.

FIG. 3B is a diagram showing the aircraft luggage bin 310 of FIG. 3A employing the disclosed system for permanent magnet damping and generated light, where the system employs a pressure sensor 320 and the aircraft luggage bin 310 is in a closed position, in accordance with at least one embodiment of the present disclosure.

In this figure, after the panel 230 of the luggage bin 210 is closed, the pressure sensor 320 senses a surface of the luggage bin 210. Once the pressure sensor 320 senses a surface of the luggage bin 210, the pressure sensor 320 notifies a control circuit (e.g., refer to 810 of FIG. 8B) that the luggage bin 210 is in a closed position. Once the control circuit is notified that the luggage bin 210 is in a closed position, the control circuit switches a switch (e.g., refer to 820 of FIG. 8B) to allow for any electrical power stored within the electrical storage unit to be dissipated, and for the electrical power to no longer power the light 250.

Figure 4:
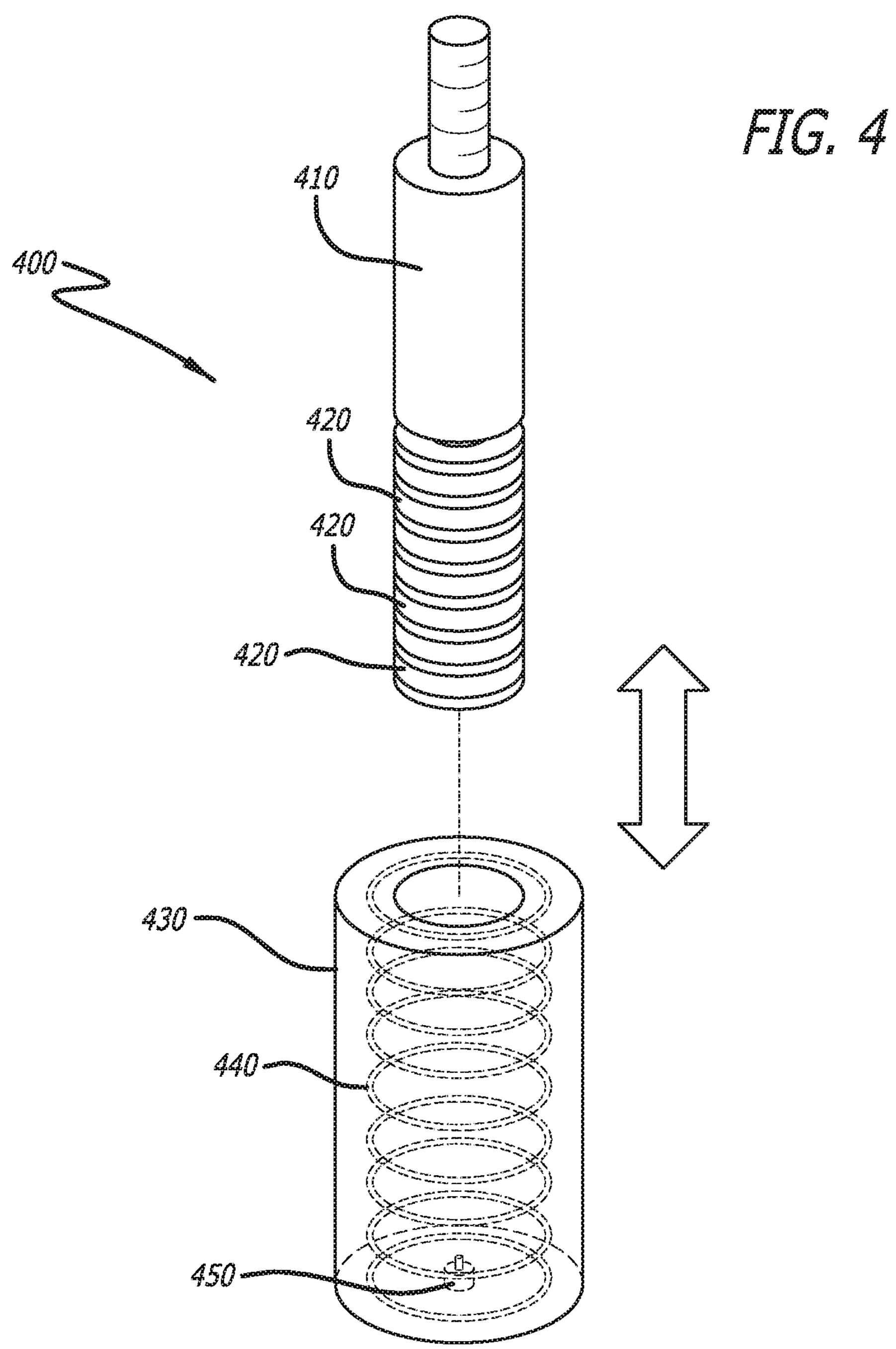
FIG. 4 is a diagram showing an exemplary permanent magnet (PM) damper that may be employed by the disclosed system for permanent magnet damping and generated light, where the PM damper comprises (1) a plunger that comprises permanent magnets, (2) a cylinder that comprises a conductive coil, and (3) an optional pressure switch, in accordance with at least one embodiment of the present disclosure.

FIG. 4 is a diagram showing an exemplary permanent magnet (PM) damper 400 that may be employed by the disclosed system for permanent magnet damping and generated light, where the PM damper 400 comprises (1) a plunger 410 that comprises permanent magnets 420, (2) a cylinder 430 that comprises a conductive coil 440, and (3) an optional pressure switch 450, in accordance with at least one embodiment of the present disclosure. It should be noted that in other embodiments, a pressure sensor (e.g., refer to 320 of FIG. 3A) may be employed by the disclosed system instead of the pressure switch 450 (e.g., also refer to 220 of FIG. 2A) shown in FIG. 4.

For the PM damper 400 of FIG. 4, when the plunger 410 is being withdrawn from the cylinder 430 (e.g., when the PM damper 400 is being moved into an opened (extended) position), the conductive coil 440 of the cylinder 430 resists the moving permanent magnets 420 of the plunger 410 to provide damping, and the kinetic energy from the movement is converted into electrical power. The undepressed pressure switch 450 switches to allow for the electrical power generated by the PM damper 400 to be stored within an electrical storage unit, such as a capacitor (e.g., refer to 710 of FIG. 7A) or a battery, and for the electrical power to be used to power a light (e.g., refer to 250 of FIG. 2A).

And, when the plunger 410 is being inputted into the cylinder 430 (e.g., when the PM damper 400 is being moved into a closed (compressed) position), an end of the plunger 410 depresses the pressure switch 450. The depressed pressure switch 450 switches to allow for any electrical power stored within the electrical storage unit to be dissipated, and for the electrical power to no longer power the light (e.g., refer to 250 of FIG. 2A).

FIG. 5A is a diagram showing an exemplary PM damper 500 that may be employed by the disclosed system for permanent magnet damping and generated light, where the PM damper 500 comprises (1) a plunger 510 that comprises permanent magnets 520, (2) a cylinder 530 that comprises a conductive coil 540, and (3) an optional pressure switch 550, where the plunger 510 is in a closed (compressed) position, in accordance with at least one embodiment of the present disclosure.

In this figure, the plunger 510 is shown to be inputted into the cylinder 530 (e.g., the PM damper 500 is in a closed (compressed) position), and an end of the plunger 510 depresses the pressure switch 550. The depressed pressure switch 550 switches to allow for any electrical power stored within an electrical storage unit, such as a capacitor (e.g., refer to 710 of FIG. 7A) or a battery, to be dissipated, and for the electrical power to no longer power a light 560.

FIG. 5B is a diagram showing the exemplary PM damper 500 of FIG. 5A, where the plunger 510 is in an open (extended) position, in accordance with at least one embodiment of the present disclosure. In this figure, the plunger 510 is shown to be withdrawn from the cylinder 530 (e.g., the PM damper 500 is in an opened (extended) position), and the pressure switch 550 is undepressed. When the plunger 510 is being withdrawn from the cylinder 530, the conductive coil 540 of the cylinder 530 resists the moving permanent magnets 520 of the plunger 510 to provide damping, and the kinetic energy from the movement is converted into electrical power. The undepressed pressure switch 550 switches to allow for the electrical power generated by the PM damper 500 to be stored within the electrical storage unit, and for the electrical power to be used to power the light 560, which is shown to be illuminated.

FIG. 6A is a diagram showing an exemplary PM damper 600 that may be employed by the disclosed system for permanent magnet damping and generated light, where the PM damper 600 comprises (1) a plunger 610 that comprises a conductive coil 640, (2) a cylinder 630 that comprises permanent magnets 620, and (3) an optional pressure switch 650, where the plunger 610 is in a closed (compressed) position, in accordance with at least one embodiment of the present disclosure.

In this figure, the plunger 610 is shown to be inputted into the cylinder 630 (e.g., the PM damper 600 is in a closed (compressed) position), and an end of the plunger 610 depresses the pressure switch 650. The depressed pressure switch 650 switches to allow for any electrical power stored within an electrical storage unit, such as a capacitor (e.g., refer to 710 of FIG. 7A) or a battery, to be dissipated, and for the electrical power to no longer power a light 660.

FIG. 6B is a diagram showing the exemplary PM 600 damper of FIG. 6A, where the plunger 610 is in an open (extended) position, in accordance with at least one embodiment of the present disclosure. In this figure, the plunger 610 is shown to be withdrawn from the cylinder 630 (e.g., the PM damper 600 is in an opened (extended) position), and the pressure switch 650 is undepressed. When the plunger 610 is being withdrawn from the cylinder 630, the permanent magnets 620 of the cylinder 630 resist the moving conductive coil 640 of the plunger 610 to provide damping, and the kinetic energy from the movement is converted into electrical power. The undepressed pressure switch 650 switches to allow for the electrical power generated by the PM damper 600 to be stored within the electrical storage unit, and for the electrical power to be used to power the light 660, which is shown to be illuminated.

FIG. 7A is a diagram showing an exemplary circuit employed for the disclosed system for permanent magnet damping and generated light, where the system employs a pressure switch 220 and the aircraft luggage bin (e.g., refer to 210 of FIG. 2A) is in an open position, in accordance with at least one embodiment of the present disclosure. In this figure, the pressure switch 220 is shown to be undepressed. The undepressed pressure switch 220 switches (in a first position) to connect the electrical power generated from the PM damper (e.g., refer to 240 of FIG. 2A) to a light 250 that is connected to a capacitor 710. This connection allows for the generated electrical power to be stored in the capacitor 710, and the light to be illuminated 250, as is shown.

FIG. 7B is a diagram showing the exemplary circuit of FIG. 7A, where the system employs a pressure switch 220 and the aircraft luggage bin (e.g., refer to 210 of FIG. 2B) is in a closed position, in accordance with at least one embodiment of the present disclosure. In this figure, the pressure switch 220 is shown to be depressed. The depressed pressure switch 220 switches (in a second position) to connect the light 250 and the capacitor 710 to a resistor 720 connected to ground. This connection allows for any electrical power stored in the capacitor 710 to dissipate through the resistor 720.

FIG. 8A is a diagram showing an exemplary circuit employed for the disclosed system for permanent magnet damping and generated light, where the system employs a pressure sensor 320 and the aircraft luggage bin (e.g., refer to 210 of FIG. 3A) is in an open position, in accordance with at least one embodiment of the present disclosure. In this figure, the pressure sensor 320 no longer senses a surface of the luggage bin 210 (refer to FIG. 3A). Once the pressure sensor 320 no longer senses a surface of the luggage bin 210, the pressure sensor 320 notifies (via sending a control signal to) a control circuit 810 that the luggage bin 210 is in an open position. Once the control circuit 810 is notified that the luggage bin 210 is in an open position, the control circuit 810 switches (via sending a switching control signal to) a switch 820 (to a first position as shown) to connect the electrical power generated from the PM damper (e.g., refer to 240 of FIG. 3A) to a light 250 that is connected to a capacitor 710. This connection allows for the generated electrical power to be stored in the capacitor 710, and the light to be illuminated 250, as is shown.

FIG. 8B is a diagram showing the exemplary circuit of FIG. 8A, where the system employs a pressure sensor 320 and the aircraft luggage bin (e.g., refer to 210 of FIG. 3B) is in a closed position, in accordance with at least one embodiment of the present disclosure. In this figure, the pressure sensor 320 senses a surface of the luggage bin 210 (refer to FIG. 3B). Once the pressure sensor 320 senses a surface of the luggage bin 210, the pressure sensor 320 notifies (via sending a control signal to) the control circuit 810 that the luggage bin 210 is in a closed position. Once the control circuit 810 is notified that the luggage bin 210 is in a closed position, the control circuit 810 switches (via sending a switching control signal to) the switch 820 (to a second position as shown) to connect the light 250 and the capacitor 710 to a resistor 720 connected to ground. This connection allows for any electrical power stored in the capacitor 710 to dissipate through the resistor 720.

FIG. 9 a flow chart showing the disclosed method 900 for damping and generating light, in accordance with at least one embodiment of the present disclosure. At the start 910 of the method 900, a permanent magnet (PM) damper connected to a panel damps a speed of opening of the panel, when the panel is opened 920. The PM damper generates electrical power, during the opening of the panel 930. The electrical power is then stored 940. The electrical power then powers lighting 950. Any remaining electrical power of the electrical power, which is stored, is dissipated, when the panel is closed 960. Then, the method 900 ends 970.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for damping and generating light, the method comprising:

actuating, a permanent magnet (PM) damper connected to a panel, by opening the panel, wherein the PM damper comprises a conductive coil and at least one permanent magnet, and the actuating of the PM damper causes the conductive coil and the at least one permanent magnet to move relative to each other;

damping, by the actuating of the PM damper, a speed of the opening of the panel;

generating, by the actuating of the PM damper, electrical power by converting kinetic energy from the actuating of the PM damper into the electrical power, during the opening of the panel;

storing the electrical power; and powering lighting by using the electrical power.

2. The method of claim 1, wherein the method further comprises dissipating any remaining of the electrical power, which is stored, when the panel is closed.

3. The method of claim 1, wherein the method further comprises, when the panel is opened, switching a switch to connect the PM damper to an electrical power storage unit such that the electrical power is stored in the electrical power storage unit.

4. The method of claim 3, wherein the electrical power storage unit is at least one capacitor and/or at least one battery.

5. The method of claim 3, wherein a control circuit switches the switch.

6. The method of claim 1, wherein the method further comprises, when the panel is closed, switching a switch to connect the PM damper to a resistor connected to ground such that any remaining electrical power of the electrical power, which is stored, is dissipated.

7. The method of claim 6, wherein a control circuit switches the switch.

8. The method of claim 1, wherein the PM damper comprises a plunger and a cylinder.

9. The method of claim 8, wherein the plunger comprises the conductive coil, and the cylinder comprises the at least one permanent magnet.

10. The method of claim 8, wherein the plunger comprises the at least one permanent magnet, and the cylinder comprises the conductive coil.

11. The method of claim 1, wherein the lighting comprises at least one light emitting diode (LED).

12. The method of claim 1, wherein the lighting is located inside an enclosure located behind the panel.

13. A system for damping and generating light, the system comprising:

a permanent magnet (PM) damper connected to a panel and configured to actuate when the panel is opened, and wherein:

the PM damper comprises a conductive coil and at least one permanent magnet, the conductive coil and the at least one permanent magnet move relative to each other when the PM damper is actuated, and speed of opening of the panel is decreased and kinetic energy of the PM damper is converted into electrical power when the PM damper is actuated;

an electrical power storage unit to store the electrical power; and lighting, which is powered by the electrical power.

14. The system of claim 13, wherein the system further comprises a switch to connect the PM damper to the electrical power storage unit, when the panel is opened, such that the electrical power is stored in the electrical power storage unit.

15. The system of claim 13, wherein the electrical power storage unit is at least one capacitor and/or at least one battery.

16. The system of claim 13, wherein the system further comprises a switch to connect the PM damper to a resistor connected to ground, when the panel is closed, such that any remaining of the electrical power, which is stored, is dissipated.

17. The system of claim 13, wherein the PM damper comprises a plunger and a cylinder.

18. The system of claim 17, wherein the plunger comprises the conductive coil, and the cylinder comprises the at least one permanent magnet.

19. The system of claim 17, wherein the plunger comprises the at least one permanent magnet, and the cylinder comprises the conductive coil.

20. The system of claim 13, wherein the lighting comprises at least one light emitting diode (LED).

* * * * *